---

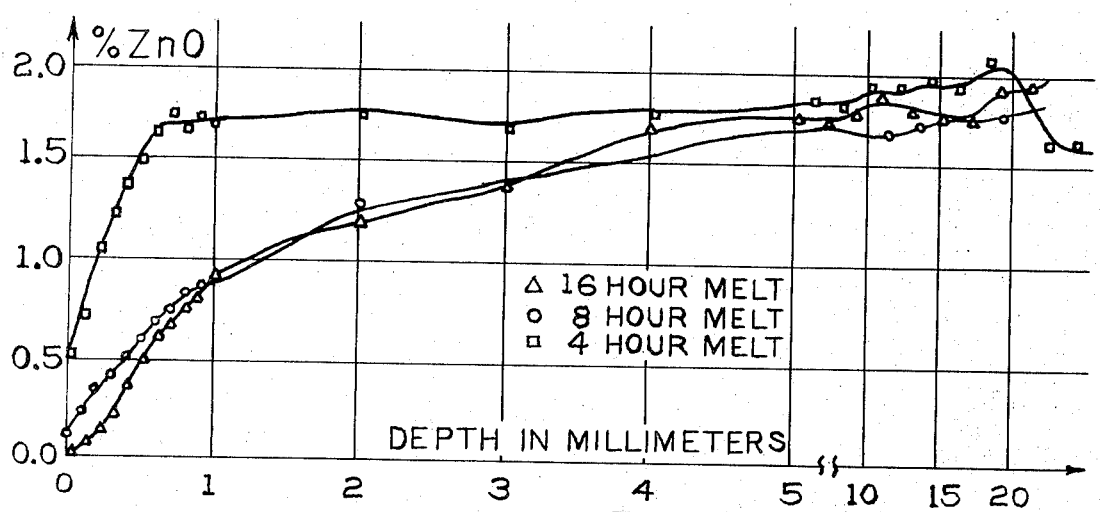
EXAMPLE XXI
ZnO Profile In Crucible Melts
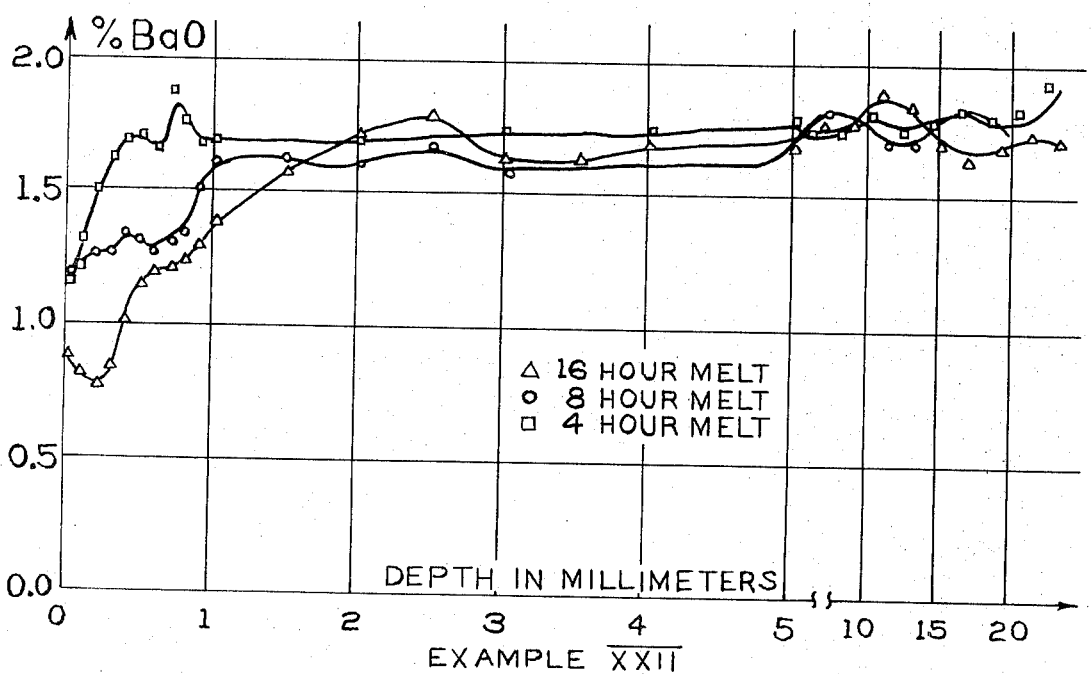
EXAMPLE XXII
BaO Profile In Crucible Melts

United States Patent Office 3,834,911
Patented Sept. 10, 1974

3,834,911
GLASS COMPOSITION AND METHOD OF MAKING
Joseph J. Hammel, Pittsburgh, Pa., assignor to
PPG Industries, Inc., Pittsburgh, Pa.
Filed May 31, 1972, Ser. No. 258,149
Int. Cl. C03c 3/22
U.S. Cl. 106—39.7                              5 Claims

ABSTRACT OF THE DISCLOSURE

Novel thermally crystallizable glass compositions which are relatively non-volatile and have good melting and forming characteristics containing: 64–74 percent $SiO_2$, 15–23 percent $Al_2O_3$, 3.3–4.8 percent $Li_2O$, 2.0–5.0 percent $TiO_2$, 0.6–1.6 percent $ZrO_2$, 1.0–2.1 percent BaO, 0.10–0.30 percent $F^-$ and 0–0.5 percent MgO, and glass-ceramic articles made therefrom are disclosed. The glass-ceramics have coefficients of thermal expansion of below $2.0 \times 10^{-7}/°$ C. over the temperature range of 0 to 300° C. and have well nucleated, smooth surfaces, making the glass-ceramics particularly useful as cooking surfaces for stove tops and the like.

BACKGROUND OF THE INVENTION

Field of the Invention: This invention relates to low volatile thermally crystallizable glass compositions which can be continuously melted and formed into a flat glass ribbon. Moreover, because the glass compositions have relatively low volatility, the continuously cast glass ribbon is extremely homogeneous from surface to surface. Another aspect of this invention relates to the resultant glass-ceramic sheets made from a crystallizing heat treatment of the aforesaid glass ribbon. The homogeneity and low volatility of the glass provides for a uniform rate of crystallization throughout the glass, resulting in high yields of crystallized glass having a smooth, glossy surface which is aesthetically appealing.

Description of the Prior Art: U.S. Pat. No. 3,625,718 to Petticrew discloses thermally crystallizable glass compositions having good melting and forming properties as well as good crystallizing characteristics. The glass compositions consist essentially of 64–74 percent $SiO_2$, 15–23 percent $Al_2O_3$, 3.3–4.8 percent $Li_2O$, 1–3.8 percent ZnO, 1.2–2.4 percent $TiO_2$ and 0–2 percent $ZrO_2$. The glasses can be heat treated to produce low expansion glass-ceramics that contain a multiplicity of very fine crystals dispersed in a glassy matrix. The key to the effectiveness of the glass composition appears to be in the incorporation of zinc oxide which acts as a fluxing agent giving lower viscosities which assist in melting and forming, yet does not adversely affect the expansion coefficient as do many other fluxes, such as sodium oxide and potassium oxide. Further, the zinc oxide in combination with the other ingredients of the glass compositions in the specified ranges set forth has been found to act as a promoter for crystallization, acting to increase the rate of crystallization.

Although the above-mentioned zinc oxide-containing glass compositions are suitable for melting in furnaces which have good mixing action and in furnaces in which the molten glass is withdrawn from the bottom of the furnace and passed directly into press molds for shaping the glass, the zinc oxide glass compositions are not particularly suitable for melting in furnaces which have little or no external stirring, or in furnaces in which the molten glass is removed from the top and continuously cast or formed into a ribbon. When the zinc oxide glasses are made in such furnaces, the resultant glass ribbon has inhomogeneities in composition in the top surface. When the glass is thermally crystallized, these inhomogeneities cause the glass to warp and crack.

In attempting to alleviate the above-described problem, it has been found that the zinc oxide-containing glasses are very volatile with zinc oxide being one of the most volatile constituents. It has been found that (see Example XXI infra) during an 8-hour melt at about 1650° C. about 65 percent of the zinc oxide is volatilized from the top surface (first millimeter) of the glass melt. This volatility results in an inhomogeneous melt with the surface of the melt having a different composition, being depleted in volatiles, from the bulk of the melt. In tank melting these inhomogeneities would result in surface inhomogeneities which would be transferred to the formed ribbon of the glass, with the ribbon surface being depleted of volatiles and being silica rich. It is believed that these differences in composition produce different rates of crystallization between the bulk and the surface of the glass, with the bulk crystallizing at a faster rate than the surface. It is known that a 2.4 percent volume change occurs when the amorphous glass is transformed to crystallized glass; therefore, if any part of the sheet is still glassy while the other is fully crystalline, when the glassy phase crystallizes, tremendous stresses would be produced which would relieve themselves by warpage, chipping, cracking, breaking, peeling or the like.

It is unfortunate that zinc oxide is so volatile in the glass composition because it has a very beneficial effect in melting, forming and crystallizing. Zinc oxide is an excellent flux, permitting melting and forming at relatively low temperatures, yet zinc oxide has a negligible effect on expansion coefficient and seems to increase the rate of crystallization during heat treatment. Other fluxes, such as $Na_2O$, $K_2O$, CaO and MgO are unacceptable as replacements for zinc oxide because they adversely affect the expansion coefficient of the resultant crystallized glass, raising it to unacceptably high values.

In accordance with this invention, it has been found that the volatility problem associated with zinc oxide-containing glasses of the above description can be reduced by essentially substituting barium oxide for the zinc oxide within a certain range. Barium oxide acts as a flux assisting in melting and fining and yet, in the specified ranges used, does not adversely affect the expansion coefficient and has a tendency to lower it to a negative value.

The incorporation of barium oxide into various glass compositions is known in the art as is exemplified by U.S. Patents 3,241,985 to Kuwayama, 3,380,818 and 3,473,936, both to Smith, and 3,582,385 to Duke et al. However, these references disclose different glass compositions than that set forth in this invention and as such fail to appreciate the significance that barium oxide has on the melting, forming and crystallizing properties of the glass compositions of this invention.

SUMMARY OF THE INVENTION

In accordance with this invention, there is provided a thermally crystallizable glass composition consisting essentially of the following components on an oxide basis:

| Component | Percent by Weight |
|---|---|
| $SiO_2$ | 64–74 |
| $Al_2O_3$ | 15–23 |
| $Li_2O$ | 3.3–4.8 |
| $TiO_2$ | 2.0–5.0 |
| $ZrO_2$ | 0.6–1.6 |
| $BaO$ | 1.0–2.1 |
| $F^-$ | 0.10–0.30 |
| $MgO$ | 0–0.50 |

Also provided are glass-ceramic articles made from the above composition through a crystallizing heat treatment.

The barium oxide-containing glass compositions of this invention are relatively non-volatile and can be melted in commercial furnace with or without external stirring and can be continuously withdrawn from the top of the furnace and shaped into ribbon form. Due to the low volatility of the glass compositions, the glass ribbon can be made homogeneous throughout. After forming, the glass ribbon can be heat treated to form a uniformly crystallized glass-ceramic sheet of extreme smoothness, free of warping, cracking and peeling, making such sheets particularly attractive for use as stove tops and the like.

BRIEF DESCRIPTION OF THE DRAWINGS

FIG. 1 shows two graphs depicting the changes in composition from surface to bulk of zinc oxide-containing and barium oxide-containing glass melts.

DETAILED DESCRIPTION

To make glass compositions in accordance with this invention, a batch of glass-making ingredients consisting mainly of silica, alumina and lithia is first mixed together and thereafter melted to dissolve and react the various ingredients. The melt is then cooled to a glass and an article of the desired configuration shaped therefrom. The glass article is then heated to the nucleation temperature range and maintained within this temperature range for a sufficient length of time to develop a substantial number of nuclei. Thereafter, the nucleated glass article is heated to the crystallization temperature for a sufficient period of time to cause the glass to crystallize and the crystals to grow.

The glass-making batch ingredients can be selected from those materials, either oxides or other compounds, which on being melted and fined together, are transformed to the desired oxide composition. Suitable batch materials include sand, flint, lithium carbonate, lithium fluoride, aluminum hydrate, kaolin, zirconium silicate, titania, barium carbonate, magnesium carbonate, magnesium chloride and petalite. Fining agents such as $As_2O_3$ and $Sb_2O_3$ can be added to the batch. The batch ingredients should be carefully proportioned such that the composition of the finished glass on an oxide basis is as follows:

| Component | Percent by weight Broad range | Preferred range |
|---|---|---|
| $SiO_2$ | 64–74 | 69–72 |
| $Al_2O_3$ | 15–23 | 18–20 |
| $Li_2O$ | 3.3–4.8 | 3.9–4.2 |
| $TiO_2$ | 2.0–5.0 | 2.5–2.9 |
| $ZrO_2$ | 0.60–1.6 | 0.90–1.1 |
| $BaO$ | 1.0–2.1 | 1.3–1.9 |
| $F^-$ | 0.10–0.30 | 0.15–0.25 |
| $MgO$ | 0–0.50 | 0–0.20 | wherein the above components constitute at least 98 percent by weight of the composition. The glass batch should be uniformly mixed in a tumbler mill, ball mill, cement mixer or any other apparatus well known in the art for glass mixing, to provide a homogeneous glass melt.

After the batch glass-making ingredients have been uniformly mixed with one another, the batch is charged to a pot or furnace where the glass is melted and fined. The temperatures for melting and fining of crystallizable glasses are in general higher than the melting and fining temperatures of more conventional glasses. Accordingly, melting and fining temperatures are about 1700° C., whereas conventional soda-lime-silica glasses are melted and fined at temperatures of about 1540° C.

After the glass has been suitably melted and fined, usually for a period of about 12–24 hours, the glass can be shaped by blowing, pressing, rolling, or any of the forming techniques well known in the art. Preferably, the glass is formed as a continuous ribbon by forming it between water-cooled rolls as it is discharged from the furnace. Methods for continuously forming glass by passing it between rolls is well known in the art as described in U.S. Patent Application Ser. No. 222,627, filed Feb. 1, 1972, to Henry M. Demarest, Jr. Glass formed in a continuous manner has obvious advantage in economics and is particularly suited for the manufacture of stove tops where the continuous ribbon, having its width equal to that of the stove top, can be cut to the desired size. Further, as has been discussed above, the low volatility of the glass composition of this invention permits melting in commercial-size furnaces which have no external stirring means, stirring being accomplished by convection currents in the melt, and which discharge glass from the top of the furnace.

After the glass is formed, it is usually annealed, inspected, and cut to size and, optionally, decorated. The glass is now ready for the crystallizing heat treatment.

In the crystallizing heat treatment, the glass is heated in an oven, a kiln or the like, rather quickly, into the nucleation range, which is about 680° C. to 735° C. and held within this temperature range for a sufficient length of time to insure the substantial development of nuclei. Nucleation times as short as one hour may be adequate, but much longer times, on the order of 5 to 6 hours, are usually employed. During the nucleation period, very small crystals in the embryo stage (nuclei) begin to emerge in the bulk of the glass. With longer nucleation times, crystals will begin to grow on these nuclei. However, crystallization at this low a temperature is too slow and costly to be feasible, and as a result, the glass is generally heated to a higher temperature to increase the rate of crystal growth. This higher temperature is referred to as the crystallization temperature and in general extends from about 735° C. to 1010° C. The rate of crystal growth is directly related to temperature and increases with higher temperatures. Thus, with high enough temperatures, i.e., 1010° C., crystallization times as brief as ½ hour may yield highly crystalline bodies. However, longer crystallization times at somewhat lower temperatures are generally preferred because in the early stages of crystallization the proportion of glassy matrix to crystals is very great and the body will readily deform if the temperature thereof is increased too rapidly as the softening point of the glassy phase is approached and surpassed. Therefore, the rate of temperature rise should, preferably, balance the rate at which crystals are growing within the glass with the required degree of fluidity in the residual glass needed to avoid stress buildup and cracking.

In the preferred practice of this invention, it has been found that the nucleated glasses should be slowly heated from the nucleation temperature range at a rate of about 10° C. per hour for a period of about 5 to 6 hours to encourage controlled crystal growth. During this period of time in which the temperature goes from about 760° C. to 800° C., the crystals grow rapidly, and in a short period of time, the material changes from a glass to a greater than 95 percent crystalline body, the remaining being a glassy phase. The crystal which first forms is beta-eucryptite. The crystallized glass is heated further at a rate of at least about 50° C. per hour, preferably faster, as fast as the oven will transfer heat to the glass-ceramic, for about 1 to 4 hours, reaching a final temperature of about 1010° C. to transform the eucryptite crystal to a beta-spodumene crystal. The temperature is held at about 1010° C. to cause the crystals of spodumene to grow, thereby forming a translucent-to-opaque body. It should be noted that the crystalline phase is a solid solution of beta-spodumene and silica (keatite structure).

After the conclusion of the heat treating cycle, the crystallized glass is cooled to room temperature as fast as possible.

With regards to the crystallizing heat treatment described above, it has been found that it is not always necessary that the glass be cooled to room temperature and then reheated to crystallize. It is possible to nucleate and crystallize in the forming and annealing operation, particularly when the glasses have higher titania contents, i.e., about 3 to 5 percent. Accordingly, the glass melt should be cooled to just below the glass transformation range, i.e., below the temperature at which the liquid melt is considered to have transformed to a glassy shape-retaining solid. The glass is then exposed to the required heat treating cycle in the lehr and is concurrently annealed.

The crystallizable glass compositions of the present invention have excellent melting and forming properties, having liquidus temperatures generally below 1370° C., and preferably below 1340° C., and can therefore be handled in commercial equipment with minimal danger of devitrification in cold spots of the furnace. Further, the crystallizable glasses have a temperature at which the logarithm of the viscosity in poises equals 4 of above 1370° C., and preferably above 1400° C., thus giving in general a working range from 0 to 60° C. Other physical properties of the crystallizable glasses are given in the table below.

TABLE I

Physical Properties of Crystallizable
Glasses of the Invention

Annealing Range _____ °C. 590–650
Strain Point _____ °C. 625–650
Softening Point _____ °C. 960–980
Density _____ grams per cubic centimeter 2.39–2.41

When the crystallizable glasses described above are heat treated, they are first transformed into a clear crystallized glass article consisting essentially of a solid solution of beta-eucryptite and silica. The crystals are very small, and do not visibly scatter light, thus giving a clear product. However, for cooking surfaces such as stove tops, it is desirable to have a translucent to an opaque product. Therefore, the beta-eucryptite crystals are transformed to beta-spodumene crystals which are large enough to give a translucent-to-opaque product which has a pleasing, glossy-white appearance. Upon X-ray diffraction analysis of the product, the primary crystal phase has been determined to be principally a solid solution of beta-spodumene and silica with other crystalline phases such as rutile present in trace amounts. X-ray diffraction further demonstrates the glass-ceramic to be highly crystalline, that is, greater than 95 percent by weight crystalline, and frequently about 98 percent by weight crystalline. Electron microscopy shows the crystals themselves are finer than 5 microns in diameter and preferably about 1 to 2 microns.

The average coefficient of thermal expansion over the temperature range of 0 to 300° C. as determined in a conventional manner using a differential dilatometer (A.S.T.M. E-228) was below $2 \times 10^{-7}/°$ C., and has been found in many instances to be slightly negative, which is preferred, in the range of from 0 to $-6 \times 10^{-7}/°$ C.

The average coefficient of thermal expansion is a particularly critical variable in the manufacture of cooking surfaces for stove tops. With stove tops, the burner portion can be at a temperature of approximately 1300° F., whereas the marginal areas are at room temperature. If the expansion coefficient of the glass-ceramic is not low enough, the portion in contact with the burners will greatly expand in reference to the marginal areas, producing high stresses leading to a high incidence of breakage. In other applications for glass-ceramics such as baking dishes, and heat exchangers such as are disclosed in U.S. Pat. No. 3,582,385 to Duke et al., the requirements of control over the coefficient of thermal expansion are not nearly as rigid due to the fact that the glass-ceramic article is heated uniformly to an elevated temperature.

The density of the glass-ceramic product was found to be about 2.48 to 2.51 grams per cubic centimeter and had a modulus of rupture as determined by A.S.T.M. C–158 of from about 10,000 to 30,000 pounds per square inch.

The thermal stability of the glass-ceramic product was very good, the product undergoing essentially no change in physical properties, such as density and crystallinity, when heated for 5 days at 700° C.

With regards to the ranges of the various components in the glass compositions of this invention, the following can be said:

The $SiO_2$ is needed to produce high temperature stability and a relatively low liquidus temperature. When the amount of $SiO_2$ exceeds the maximum, the glasses become infusible. When the amount of $SiO_2$ is below the minimum, the liquids temperature becomes undesirably high, and the resultant glass-ceramic article has too high an expansion coefficient.

The amount of $Al_2O_3$ is needed to maintain a low liquidus temperature and a low expansion coefficient. When the amount of $Al_2O_3$ is below the minimum, it is difficult to crystalize the glass in a satisfactory manner; the glass-ceramic articles have an extremely rough surface which stains easily and is difficult to clean. When the amount of $Al_2O_3$ exceeds the maximum, the coefficient of thermal expansion of the glass-ceramic is undesirably high.

The $Li_2O$ is needed to maintain a low expansion coefficient, low electrical conductivity and good melting properties. When the $Li_2O$ exceeds the maximum, the electrical conductivity becomes too high, thus increasing the danger of electrical shock when the glass-ceramic is used as a stove top on an electric range. Also, high $Li_2O$-containing glasses are difficult to clean. When the $Li_2O$ is below the minimum, the glass composition becomes infusible.

In addition to the ranges of $Al_2O_3$ and $Li_2O$ set forth above, the $Al_2O_3$ and $Li_2O$ must bear a certain weight ratio to one another with the $Li_2O/Al_2O_3$ ratio being between 0.18 and 0.26, and preferably within the range of 0.20 and 0.24. A ratio in the desired range is a principal factor providing low expansion coefficients in the resultant crystallized glass article. Lower ratios give undesirably high expansion coefficients.

The $TiO_2$ and $ZrO_2$ are needed to maintain good nucleation and low liquidus temperatures. When the $TiO_2$ is above the maximum, rutile and anatase are precipitated, leading to higher expansion coefficients. When $TiO_2$ is below the minimum, the extent of nucleation is insufficient and the resultant crystals are coarse, giving a glass-ceramic article with an undesirable appearance.

It is preferable in most instances to use upwards of 2.5 percent $TiO_2$ in the glass composition to get maximum nucleation, which upon crystallization, results in the formation of a glass-ceramic with fine-grained crystals of uniform size. Such a glass-ceramic has a glossy aesthetic whiteness about it which makes it particularly attractive for cooking surfaces. With lower ranges of titania, i.e., about 2.0 percent, nucleation is correspondingly less and a product with fewer and coarser crystals is formed which, although acceptable, is generally a little weaker and not nearly as pleasant looking. Moreover, as has been mentioned above, higher titania-containing glasses are somewhat easier to nucleate and can be crystallized after forming and during the annealing operation.

When the amount of $ZrO_2$ exceeds the maximum, the liquidus temperature of the glass becomes too high for practical commercial use. When the amount of $ZrO_2$ is below the minimum, the surface finish of the crystallized glass is poor, being rough in texture and dull in appearance.

Fluoride is needed to lower melting and fining temperatures and also seems to have a positive effect on crystal growth, tending to increase the rate of crystallization. Also, fluoride produces a shallow compression layer in the surface of the crystallized glass to a depth of about 40 microns. This compression layer has particular utility when the crystallized glass article is used as a range top. Although the compression layer can be easily penetrated by the abrading action of pots and pans and the like being pushed across its surface, still, the under surface of the stove top will be relatively free from these influences. Thus, when the underside is subjected to a tension force, such as would occur when the topside of the range is put into compression by being knocked about by pots and pans, the compressive force on the underside will resist the tension forces and insure against premature breakage of the stove top. Fluoride is a very volatile constituent and care should be taken that its concentration be controlled within the above-described limits. It is difficult to have fluoride ion exceed the maximum because of its volatility. When attempts are made to get higher fluoride ion concentrations, the amount of volatilized fluoride becomes a pollution and health hazard. When the fluoride is below the minimum, melting and fining must be conducted at very high temperatures which shortens the life of the production equipment.

Barium oxide acts as a flux and aids in melting and fining and does not have any appreciable effect on the expansion coefficient when used in the recommended proportions. Other fluxing agents, such as calcium oxide, magnesium oxide, sodium oxide and potassium oxide, when used in comparable proportions are unacceptable substitutes for barium oxide because they raise the expansion coefficient to unacceptably high values. Moreover, barium oxide is relatively non-volatile, for example, as is shown in Examples XXI and XXII, it is 40 percent less volatile than zinc oxide, and as such helps provide a more uniform composition between the surface and the bulk portions of the glass. Since the composition of the resultant crystallized glass article is relatively uniform from bulk to surface, the rate of crystallization is also rather uniform, giving a well crystallized glass-ceramic article with a glossy, smooth surface. When the barium oxide content is above the maximum, the expansion coefficient becomes too high. When the barium oxide content is below the minimum, the melting and fining temperatures become higher.

As optional ingredients, a small amount, that is, up to 0.5 percent magnesium oxide can be added to the glass composition, preferably when the barium oxide content is in the lower portion of the recommended range. Magnesium oxide is a good flux and assists in melting and fining. In the recommended concentration ranges, magnesium oxide has little appreciable effect on the expansion coefficient. When magnesium oxide exceeds the maximum amount recommended, the expansion coefficient becomes too high.

Other optional ingredients which can in total, but not any individual ingredient, constitute up to 2 percent by weight of the glass composition include fining agents, such as $As_2O_3$, $Sb_2O_3$, scumming agents, such as $SO_4^=$. Fluxing agents such as $Na_2O$, $K_2O$ and $CaO$ can be tolerated in small amounts provided they do not adversely affect the expansion coefficient. Many of these ingredients show up in the glass composition as impurities in the various batch ingredients used to make up the composition.

EXAMPLES

Examples I and II

Examples I and II show the preparation and physical properties of the thermally crystallizable glasses and the resultant glass-ceramic articles produced therefrom, which are preferred in the practice of the invention.

The following well-mixed batch ingredients were charged separately, and on a continuous basis, to the feed end of a commercial-size furnace (i.e., capable of containing 2 tons of molten glass) designed for the continuous melting and forming glass sheet:

| Ingredient | Parts by weight of— | |
|---|---|---|
| | Ex. I | Ex. II |
| Silica | 699 | 708.5 |
| Hydrated alumina | 292 | 280 |
| Lithium carbonate | 103.5 | 99.5 |
| Lithium fluoride | 4.1 | 4.7 |
| Titanium dioxide | 28 | 28 |
| Zirconium silicate | 11.5 | 10.7 |
| Barium carbonate | 24.5 | 18.2 |
| Magnesium carbonate | | 5.3 |
| Antimony trioxide | 3 | 2.5 |

The glass was melted and fined for about 24 hours in the furnace at a temperature of about 1650° C. The molten glass was removed from the tank and continuously formed between a pair of heavy cast-iron water-cooled rolls. The formed sheet is picked up on smaller apron rolls which are actually a part of an annealing lehr mechanism but are not enclosed as is the rest of the lehr. In this area, the glass loses heat rapidly and the temperature falls from about 1370 C., leaving the rolls, to about 1150° C., entering the lehr. In the lehr the glass is annealed to release the thermal strains which are introduced into the glass by forming. After annealing, the glass is inspected, cut to size and optionally decorated. The glass at this stage has a nominal thickness of about 0.2 inch and has the following composition:

| Component | Percent by weight of— | |
|---|---|---|
| | Ex. I | Ex. II |
| $SiO_2$ | 69.8 | 70.8 |
| $Al_2O_3$ | 19.7 | 19.0 |
| $Li_2O$ | 4.14 | 4.03 |
| $TiO_2$ | 2.89 | 2.87 |
| $ZrO_2$ | 0.95 | 0.96 |
| $BaO$ | 1.88 | 1.45 |
| $MgO$ | | 0.27 |
| $Sb_2O_3$ | 0.25 | 0.22 |
| $F-$ | 0.14 | 0.16 |

The glass compositions of Examples I and II have the following melting and fining parameters:

| | Example I | Example II |
|---|---|---|
| Melting and fining parameters: | | |
| Liquidus, ° C | 1,350 | 1,337 |
| Softening point, ° C | 970 | 976 |
| Annealing range, ° C | 615–700 | 625–705 |
| Strain point, ° C | 645 | 648 |
| Viscosity, poises at— | | |
| Log 2.00 | 1,836 | 1,858 |
| Log 3.00 | 1,561 | 1,583 |
| Log 4.00 | 1,365 | 1,385 |
| Log 5.00 | 1,216 | 1,232 |

The glass sheets of Examples I and II were transferred to a kiln for heat treatment. The temperature of the kiln was raised quickly from room temperature to 700–735° C. (nucleation temperature) and held at this temperature for about 5 to 6 hours. The temperature in the kiln was then slowly raised at a rate of about 10° C. per hour for a period of about 6 to 8 hours to a temperature of about 800° C. The glass which has by now crystallized is further heated by raising the temperature of the kiln at a rate of 60° C. per hour for about 4 hours, reaching a final temperature of about 1010° C. The temperature was held at this level for about 3 hours. The kiln temperature was then lowered at a rate of about 80° C. per hour to 700° C., and then slowly cooled to room temperature. The glass was removed from the kiln inspected and tested for physical properties, which are reported below.

|  | Example I | Example II |
|---|---|---|
| Physical properties: | | |
| Appearance | White opaque | White opaque. |
| Principal crystal phase | Beta-spodumene solid solution | Beta-spodumene solid solution. |
| Extent of crystallization | About 98% | About 98%. |
| Expansion coefficient 25–300° C. | $-1.7 \times 10^{-7}/°C$ | $-1.3 \times 10^{-7}/°C$. |
| Log resistivity, ohm-cm.: | | |
| 25° C | 13.3 | |
| 100° C | 10.3 | |
| 200° C | 7.8 | |
| 300° C | 6.2 | |
| 400° C | 5.0 | |
| 500° C | 4.1 | |
| Density—glass | 2.394 | 2.391. |
| Density—glass-ceramic | 2.500 | 2.500. |
| Thermal stability (5 days at) | 700° C | 700° C. |

Examples III–XX

In the following example, laboratory scale melts were prepared. The batch ingredients which in general consisted of silica, hydrated alumina, lithium carbonate, lithium sulfate, lithium fluoride, titanium dioxide, zirconium silicate, barium carbonate, magnesium carbonate, antimony oxide and arsenic oxide were first roll milled together to aid in obtaining a homogeneous melt. The well-mixed batch ingredients were then placed in either 4-inch diameter or 6-inch diameter open Lavasil crucibles capable of holding from 1300 to 2500 grams of batch material. The crucibles were equipped with a platinum stirring device which continuously stirred the melt. The melting times ranged between 8 to 16 hours at a temperature of about 1600° C. to 1625° C. At the completion of melting, the glass was poured onto a steel sheet and rolled to form an 8 x 16 inch sheet of about ¼ inch in thickness. The glass was then transferred to an annealer which was at a temperature of about 625° C. and the glass was annealed by permitting the temperature to drop slowly to room temperature.

Table II presented below shows the compositions of various thermally crystallizable glasses which were prepared in accordance with the invention.

The thermally crystallizable glass samples reported immediately above were transferred to a preheated kiln for heat treatment. The temperature of the kiln was at 650° C. The kiln temperature was then increased to 800° C. at the rate of 10° C. per hour. From 800° C. the kiln temperature was increased to 1010° C. at the rate of 60° C. per hour and held at 1010° C. for 2 hours. The kiln temperature was then slowly lowered to room temperature. The glass samples were removed from the kiln and upon visual examination, were found to be white and opaque. Upon X-ray diffraction analysis, the crystalline phase was found to be principally a solid solution of beta-spodumene and silica. The extent of crystallization was determined to be greater than 95 percent. The coefficient of thermal expansion from 0 to 300° C. and the visual evaluation of surface properties of the heat treated samples are reported in Table III below.

TABLE III

Coefficient of thermal expansion and surface properties of the glass-ceramic articles of Examples III to XX

| Ex. No. | Expansion coefficient $\times 10^{-7}/C.$ 0 to 300° C. | Surface properties |
|---|---|---|
| III | 0 | Well nucleated, glossy surface—minor, very fine crazing. |
| IV | 0.8 | Well nucleated, glossy surface—no crazing. |
| V | −1.5 | Do. |
| VI | 1.0 | Do. |
| VII | −1.1 | Do. |
| VIII | 0.1 | Do. |
| IX | −5.5 | Well nucleated, glossy surface—minor crazing. |
| X | −0.4 | Well nucleated, glossy surface—no crazing. |
| XI | −1.5 | Do. |
| XII | −1.6 | Do. |
| XIII | −1.7 | Do. |
| XIV | −2.6 | Do. |
| XV | −1.8 | Do. |
| XVI | −2.2 | Do. |
| XVII | 1.0 | Do. |
| XVIII | 0.7 | Do. |
| XIX | −10.4 | Do. |
| XX | −1.3 | Well nucleated, glossy surface—faint crazing. |

Examples XXI and XXII

The following examples compare the volatility of a ZnO-containing glass melt such as the type disclosed in the Petticrew patent, U.S. Pat. No. 3,625,718, and of an analogous BaO-containing glass melt in which BaO is

TABLE II.—GLASS COMPOSITIONS OF THE INVENTION

| Component | Example number, percent by weight | | | | | | | | |
|---|---|---|---|---|---|---|---|---|---|
|  | III | IV | V | VI | VII | VIII | IX | X | XI |
| $SiO_2$ | 71.0 | 71.0 | 71.0 | 71.0 | 71.0 | 71.0 | 70.3 | 70.3 | 70.2 |
| $Al_2O_3$ | 19.0 | 19.0 | 19.0 | 19.0 | 19.0 | 19.0 | 19.0 | 19.1 | 19.0 |
| $Li_2O$ | 4.1 | 4.1 | 4.1 | 4.1 | 4.1 | 4.1 | 4.10 | 4.12 | 4.10 |
| $TiO_2$ | 2.8 | 2.8 | 2.8 | 2.8 | 2.8 | 2.8 | 2.80 | 2.80 | 2.80 |
| $ZrO_2$ | 0.6 | 0.8 | 1.0 | 1.2 | 0.8 | 1.2 | 1.00 | 1.00 | 1.00 |
| $MgO$ | 0.5 | 0.5 | 0.5 | 0.5 |  |  |  | 0.25 | 0.50 |
| $BaO$ | 1.50 | 1.50 | 1.50 | 1.50 | 1.78 | 1.78 | 1.78 | 1.78 | 1.50 |
| $Sb_2O_3$ | 0.50 | 0.50 | 0.50 | 0.50 | 0.50 | 0.50 | 0.50 | 0.32 | 0.50 |
| $As_2O_3$ | 0.25 | 0.25 | 0.25 | 0.25 | 0.25 | 0.25 | 0.25 | 0.12 | 0.25 |
| $F^-$ | 0.16 | 0.16 | 0.16 | 0.16 | 0.16 | 0.16 | 0.19 | 0.27 | 0.19 |

| Component | Example number, percent by weight | | | | | | | | |
|---|---|---|---|---|---|---|---|---|---|
|  | XII | XIII | XIV | XV | XVI | XVII | XVIII | XIX | XX |
| $SiO_2$ | 71.0 | 71.0 | 72.01 | 71.25 | 71.4 | 69.30 | 68.90 | 67.5 | 68.9 |
| $Al_2O_3$ | 18.4 | 18.4 | 18.17 | 18.32 | 18.1 | 19.81 | 20.27 | 21.0 | 18.9 |
| $Li_2O$ | 4.30 | 4.30 | 4.31 | 4.23 | 4.35 | 4.22 | 4.20 | 4.12 | 4.2 |
| $TiO_2$ | 2.00 | 2.00 | 3.00 | 2.93 | 2.8 | 2.94 | 2.96 | 2.78 | 2.9 |
| $ZrO_2$ | 1.78 | 1.78 | 0.82 | .77 | 0.7 | 0.78 | .73 | 1.00 | 1.08 |
| $MgO$ | 0.24 |  |  | .10 | 0.3 |  |  | .25 | .26 |
| $BaO$ | 1.40 | 1.40 | 1.08 | 1.86 | 1.4 | 1.99 | 2.03 | 1.77 | 2.07 |
| $Sb_2O_3$ | 0.30 | 0.30 | 0.16 | .14 | 0.16 | .28 | .29 | .32 | .5 |
| $As_2O_3$ |  |  |  |  |  |  | .12 | .12 | .25 |
| $F^-$ | 0.41 | 0.41 | 0.21 | .20 | 0.33 | 0.18 | .16 | .27 | .16 | substituted for ZnO. The compositions of the respective glasses being compared are as follows:

| Component | Ex. XXI | Ex. XXII |
|---|---|---|
| SiO₂ | 71.1 | 71.1 |
| Al₂O₃ | 19.3 | 19.3 |
| Li₂O | 4.15 | 4.15 |
| ZnO | 1.80 | ---- |
| BaO | ---- | 1.80 |
| TiO₂ | 1.45 | 1.45 |
| ZrO₂ | 1.47 | 1.47 |
| Sb₂O₃ | 0.16 | 0.16 |
| As₂O₃ | 0.36 | 0.36 |
| F⁻ | 0.19 | 0.19 |

The glass-making batch ingredients corresponding to the above compositions were placed in Lavasil crucibles and melted in a glass-fired kiln at about 1650° C. with no stirring. A total of six melts were prepared, three of each composition. At the end of 4, 8 and 16 hours, two melts, one of each composition, were removed from the furnaces and cooled slowly to room temperature to solidify the melt. The exposed surface of the glass was then subjected to X-ray fluorescence analysis to measure the ZnO and the BaO content of the fused melts. After the ZnO and BaO contents were determined, the fused melts were ground and polished to remove about a 1/10 of a millimeter of the surface. The fresh surface was then subjected to an X-ray fluorescence analysis to once again determine the ZnO and BaO content of the melts. This process was repeated for each 1/10 of a millimeter until a total depth of 1 millimeter had been ground and polished away. Thereafter, the X-ray fluorescence analysis and grinding and polishing procedure was repeated for each millimeter of surface until a total of 5 millimeters had been ground and polished away. After this much of the glass surface had been ground and polished away, the process was repeated for each two millimeters of surface until a total of 20 millimeters of the surface had been removed. The results of the X-ray fluorescence analysis are shown graphically in FIG. 1. From analyzing the figure, it can be seen that there is a significant loss of zinc oxide from the Example XXI crucible melts, whereas for the Example XXII crucible melts, the loss of barium oxide from the first one millimeter of surface is about 40 percent less. The results of FIG. 1 are summarized in Table IV below.

TABLE IV

The volatile loss of ZnO and BaO from the surace of glass melts

| Melting time in hours | Average percent loss in the first millimeter of exposed surface | |
|---|---|---|
| | Ex. XXI ZnO | Ex. XXII BaO |
| 4 | 20 | 10 |
| 8 | 65 | 25 |
| 16 | 71 | 35 |

I claim:
1. A glass-ceramic article being essentially free of ZnO and consisting essentially of a multiplicity of fine-grained crystals dispersed in a glassy matrix, the crystals being formed by crystallization in situ of a glass article consisting essentially by weight on the oxide basis of about:

| Component: | Percent by weight |
|---|---|
| SiO₂ | 64–74 |
| Al₂O₃ | 15–23 |
| Li₂O | 3.3–4.8 |
| TiO₂ | 2.0–5.0 |
| ZrO₂ | 0.6–1.6 |
| BaO | 1.0–2.1 |
| F⁻ | 0.10–0.30 |
| MgO | 0–0.5 | and the weight ratio of Li₂O to Al₂O₃ is within the range of 0.20 and 0.24; said glass-ceramic article having an average coefficient of thermal expansion between 0 and 300° C. of from about −10 to less than 2×10⁻⁷/° C.; the crystalline phase constituting at least 95 percent by weight of the article and being selected from the class consisting of beta-eucryptite solid solution and beta-spodumene solid solution.

2. The glass-ceramic article of Claim 1, in which the crystals have a particle size finer than one micron in diameter.

3. The glass-ceramic article of Claim 1, which has an average coefficient of thermal expansion between 0 and 300° C. of from 0 to −6×10⁻⁷/° C.

4. The glass-ceramic article of Claim 1 in sheet form.

5. A glass-ceramic article being essentially free of ZnO and consisting essentially of a multiplicity of fine-grained crystals dispersed in a glassy matrix, crystals being formed by crystallization in situ of a glass article consisting essentially of by weight on the oxide basis of about:

| Component: | Percent by weight |
|---|---|
| SiO₂ | 69–72 |
| Al₂O₃ | 18–20 |
| Li₂O | 3.9–4.2 |
| TiO₂ | 2.5–2.9 |
| ZrO₂ | 0.9–1.1 |
| BaO | 1.3–1.9 |
| F⁻ | 0.15–0.25 |
| MgO | 0.0–0.20 | and the weight ratio of Li₂O to Al₂O₃ is within the range of 0.20 and 0.24; said glass-ceramic article having an average coefficient of thermal expansion between 0 and 300° C. of from about −10 to less than 2×10⁻⁷/° C.; the crystalline phase constituting at least 95 percent by weight of the article and being selected from the class consisting of beta-eucryptite solid solution and beta-spodumene solid solution.

References Cited

UNITED STATES PATENTS

| 3,157,522 | 11/1964 | Stoukey | 106—39.7 X |
| 3,499,773 | 3/1970 | Petticrew | 106—39.7 |
| 3,582,385 | 6/1971 | Duke et al. | 106—52 |
| 3,148,994 | 9/1964 | Voss | 106—39 DV |
| 3,615,759 | 10/1971 | Busdiecker et al. | 106—52 |
| 3,625,718 | 12/1971 | Petticrew | 106—39 DV |

HELEN M. McCARTHY, Primary Examiner

U.S. Cl. X.R.

65—33; 106—39.8, 52